United States Patent
Mitsuhashi (10) Patent No.: US 9,608,293 B2
(45) Date of Patent: Mar. 28, 2017

(54) METHOD OF MANUFACTURING LITHIUM-ION SECONDARY BATTERY

(71) Applicant: TOYOTA JIDOSHA KABUSHIKI KAISHA, Toyota-shi, Aichi (JP)

(72) Inventor: Toshihiko Mitsuhashi, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/764,752

(22) PCT Filed: Jan. 15, 2014

(86) PCT No.: PCT/JP2014/050578
§ 371 (c)(1),
(2) Date: Jul. 30, 2015

(87) PCT Pub. No.: WO2014/119368
PCT Pub. Date: Aug. 7, 2014

(65) Prior Publication Data
US 2015/0372343 A1      Dec. 24, 2015

(30) Foreign Application Priority Data
Feb. 4, 2013   (JP) ................. 2013-019493

(51) Int. Cl.
| | |
|---|---|
| *H01M 10/058* | (2010.01) |
| *H01M 10/44* | (2006.01) |
| *H01M 2/36* | (2006.01) |
| *H01M 10/0525* | (2010.01) |
| *H01M 10/0567* | (2010.01) |
| *H01M 10/0587* | (2010.01) |

(52) U.S. Cl.
CPC ..... *H01M 10/058* (2013.01); *H01M 10/0525* (2013.01); *H01M 10/0567* (2013.01); *H01M 10/0587* (2013.01); *H01M 10/446* (2013.01); *H01M 2/362* (2013.01); *H01M 2220/20* (2013.01); *Y02E 60/122* (2013.01)

(58) Field of Classification Search
None
See application file for complete search history.

(56) References Cited

U.S. PATENT DOCUMENTS

2012/0288751 A1    11/2012    Kako et al.

FOREIGN PATENT DOCUMENTS

| CN | 102780035 A | 11/2012 |
|---|---|---|
| JP | 6-302337 A | 10/1994 |
| JP | 2005-32712 A | 2/2005 |
| JP | 2009-110886 A | 5/2009 |

*Primary Examiner* — Ladan Mohaddes
(74) *Attorney, Agent, or Firm* — Sughrue Mion, PLLC (57) ABSTRACT

A method of manufacturing a lithium-ion secondary battery proposed herein includes the following steps of: preparing a battery in which an electrode assembly is enclosed in a battery case; filling a first electrolyte solution containing a film forming agent into the battery case; charging and discharging the battery filled with the first electrolyte solution; discharging the first electrolyte solution from the battery that has been charged and discharged; and filling a second electrolyte solution containing a film forming agent at a concentration of less than 0.005 mol/L into the battery case from which the first electrolyte solution has been discharged.

3 Claims, 7 Drawing Sheets

METHOD OF MANUFACTURING LITHIUM-ION SECONDARY BATTERY

CROSS REFERENCE TO RELATED APPLICATIONS

This application is a National Stage of International Application No. PCT/JP2014/050578 filed Jan. 15, 2014, claiming priority based on Japanese Patent Application No. 2013-019493 filed Feb. 4, 2013 the contents of all of which are incorporated herein by reference in their entirety.

TECHNICAL FIELD

The present invention relates to a method of manufacturing a lithium-ion secondary battery.

BACKGROUND ART

JP 2005-32712 A, for example, discloses a lithium-ion secondary battery. The publication discloses that the lithium-ion secondary battery is filled with an electrolyte solution in which $LiPF_6$ serving as an electrolyte is dissolved in a mixed organic solvent of 3:7 volume ratio of ethylene carbonate and diethyl carbonate and $LiPF_2(C_2O_4)_2$ is further added thereto. It also discloses that the addition of an appropriate amount of $LiPF_2(C_2O_4)_2$ significantly improves the output power performance at low temperature. It describes that the reason for the significant improvement in the output power performance at low temperature is that at least a part of the additive agent $LiPF_2(C_2O_4)_2$ is decomposed during initial charging to form a stable surface film on the surfaces of the positive electrode and/or the negative electrode as well as the surfaces of the positive electrode active material and/or the negative electrode active material. It is considered that the surface film activates the interface between the active materials and the electrolyte solution (i.e., the interface between the electrodes and the electrolyte solution), allowing smooth insertion and deinsertion of lithium ions.

JP 1994-302337 A discloses a non-aqueous electrolyte battery in which at least one kind of solvent that constitutes an electrolyte solution is impregnated into at least one of positive and negative electrodes and thereafter separators are interposed between the positive and negative electrodes to produce a battery element. The publication also discloses that, in another embodiment, a non-aqueous electrolyte battery is produced by impregnating at least one kind of solvent that constitutes an electrolyte solution into a battery element having positive and negative electrodes and separators interposed between the positive and negative electrodes, thereafter enclosing the battery element into a battery case, and then filling the electrolyte solution containing the remaining constituent components into the battery case. According to the publication, this allows the electrolyte solution to be impregnated into the battery element smoothly.

CITATION LIST

Patent Literature

[Patent Literature 1] JP 2005-32712 A
[Patent Literature 2] JP 1994-302337 A

SUMMARY OF INVENTION

Technical Problem

When $LiPF_2(C_2O_4)_2$, for example, is added as an additive agent to the non-aqueous electrolyte solution of a lithium-ion secondary battery, the $LiPF_2(C_2O_4)_2$ is decomposed during the initial charging and discharging, and a surface film is formed in the electrode assembly. Such a surface film serves to prevent the resistance increase and to improve the battery life. However, when $LiPF_2(C_2O_4)_2$ is decomposed, gases ($CO$ and $CO_2$) are generated, and consequently, the internal pressure of the battery is increased. For this reason, a gas venting process is performed. However, if excess $LiPF_2(C_2O_4)_2$ still remains in the electrolyte solution, surface film may be excessively formed, or gases may be further generated after the gas venting, causing the battery internal pressure to increase. For example, even in the case that an appropriate surface film is formed in the electrode assembly by the addition of $LiPF_2(C_2O_4)_2$, it is desirable to suppress the subsequent increase of the battery internal pressure due to the generation of gases derived from the additive agent.

Solution to Problem

A method of manufacturing a lithium-ion secondary battery proposed herein includes the following steps.

Preparing a battery in which an electrode assembly is enclosed in a battery case;

Filling a first electrolyte solution containing a film forming agent into the battery case;

Charging and discharging the battery filled with the first electrolyte solution;

Discharging the first electrolyte solution from the battery that has been charged and discharged; and Filling a second electrolyte solution containing a film forming agent at a concentration of less than 0.005 mol/L into the battery case from which the first electrolyte solution has been discharged.

In such a method of manufacturing a lithium-ion secondary battery, the film forming agent is decomposed and a required surface film is formed, for example, in the step of charging and discharging the battery filled with the first electrolyte solution containing the film forming agent. Thereafter, the first electrolyte solution containing the film forming agent is discharged, and the second electrolyte solution containing a film forming agent at a concentration of less than 0.005 mol/L is filled into the battery case. As a result, an appropriate surface film can be formed in the electrode assembly, and also, the amount of the film forming agent remaining in the electrolyte solution can be reduced to a small amount. Then, the amount of the gases that are subsequently generated in the battery case due to the film forming agent can be reduced to a small amount, and the increase of the battery internal pressure can be suppressed to a small extent.

Herein, it is possible that the second electrolyte solution may be free of the film forming agent. This makes it possible to further reduce the amount of the film forming agent remaining in the battery. Therefore, the increase of the battery internal pressure can be suppressed to a smaller extent. It is possible that the film forming agent may be, for example, at least one additive agent selected from the group consisting of $LiPF_2(C_2O_4)_2$, $LiB(C_2O_4)_2$, $LiPF_2(C_3O_4)_2$, and $LiB(C_3O_4)_2$.

DESCRIPTION OF EMBODIMENTS

Hereinbelow, a method of manufacturing a lithium-ion secondary battery according to one embodiment of the present invention will be described. The embodiments described herein are not intended to limit the present invention. The drawings are depicted schematically, and the dimensional relationship (length, width, thickness, and the like) in the drawings does not necessarily reflect actual dimensional relationship. The parts and components that exhibit the same effects are denoted by the same reference symbols, and repetitive description thereof may be omitted.

Herein, an example of the structure of an applicable lithium-ion secondary battery will be described first, and subsequently, a method of manufacturing the lithium-ion secondary battery proposed herein will be described.

<<Lithium-Ion Secondary Battery 10 (Sealed-Type Lithium-Ion Secondary Battery)>>

Figure 1:
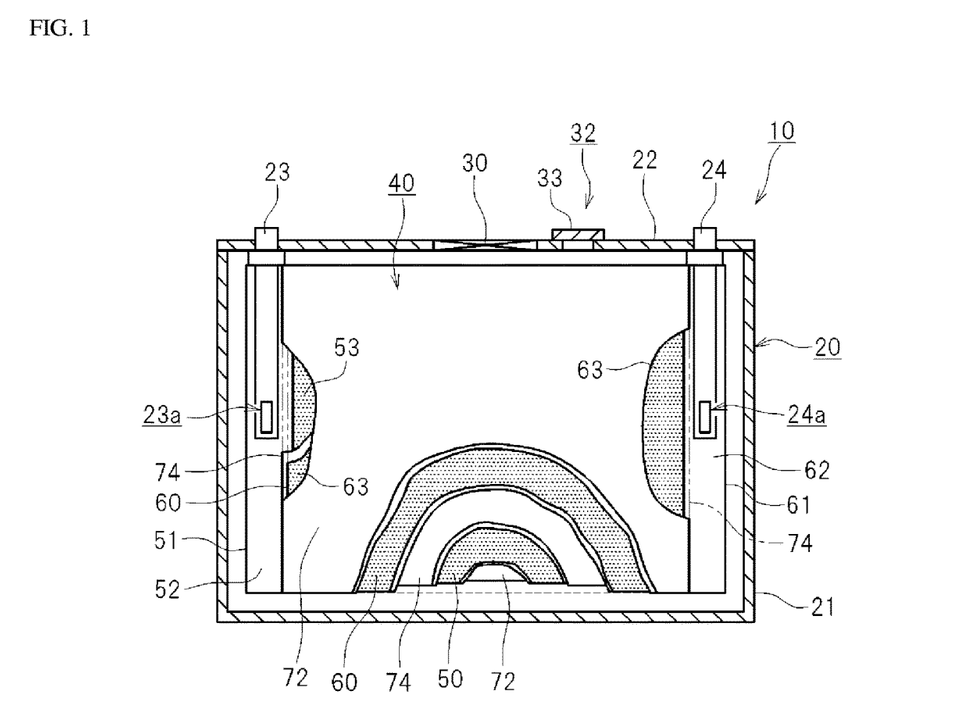
FIG. 1 is a cross-sectional view illustrating a lithium-ion secondary battery.
Figure 2:
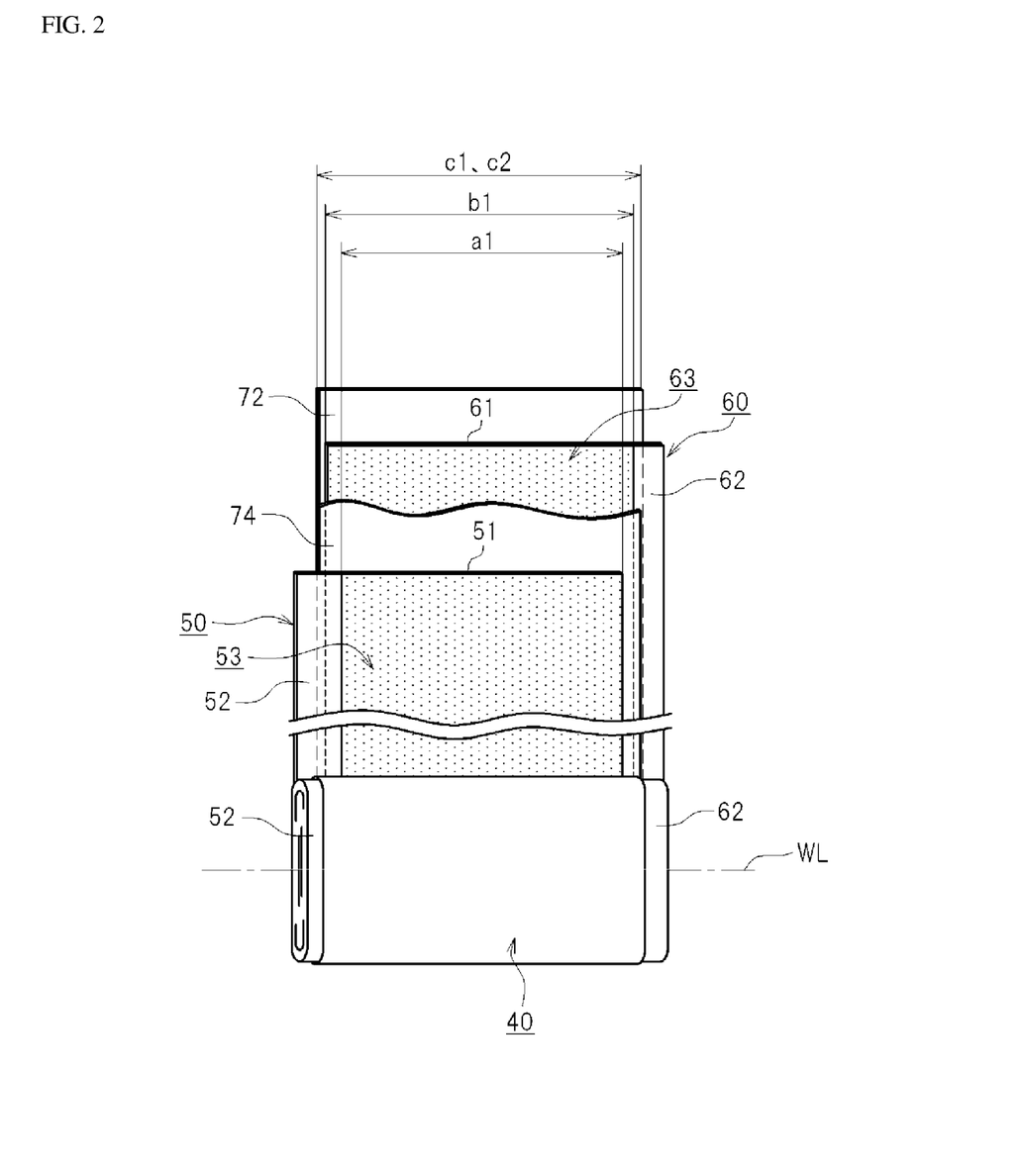
FIG. 2 is a view illustrating an electrode assembly incorporated in the lithium-ion secondary battery.

FIG. 1 is a cross-sectional view illustrating a lithium-ion secondary battery 10. FIG. 2 is a view illustrating an electrode assembly 40 to be enclosed in the lithium-ion secondary battery 10. It should be noted that the lithium-ion secondary battery 10 depicted in FIGS. 1 and 2 merely illustrates an example of the lithium-ion secondary battery to which the present invention can be applied, and it does not specifically limit the lithium-ion secondary battery to which the present invention can be applied.

As illustrated in FIG. 1, the lithium-ion secondary battery 10 has a battery case 20 and the electrode assembly 40 (wound electrode assembly in FIG. 1). Herein, the term "sealed-type lithium-ion secondary battery" means a lithium-ion secondary battery in which the battery case is hermetically sealed.

<<Battery Case 20>>

The battery case 20 has a case main body 21 and a sealing plate 22. The case main body 21 has a box shape one end of which has an opening. The case main body 21 has a closed-bottom rectangular parallelepiped shape. The one face of the rectangular parallelepiped shape, which corresponds to the upper face of the lithium-ion secondary battery 10 in the condition of normal use, is open. In this embodiment, a rectangular opening is formed in the case main body 21. The sealing plate 22 is a member for closing the opening of the case main body 21. The sealing plate 22 comprises a substantially rectangular plate. The sealing plate 22 is welded to the peripheral edge of the opening of the case main body 21 to form the battery case 20 in a substantially hexahedral shape.

As the battery case 20, for example, the battery case 20 made mainly of a lightweight and highly heat-conductive metal material is preferably used. Examples of such a metal material include aluminum, stainless steel, and nickel-plated steel. The battery case 20 (including the case main body 21 and the sealing plate 22) of the present embodiment is made of aluminum or an alloy mainly composed of aluminum.

In the example shown in FIG. 1, a positive electrode terminal 23 (external terminal) and a negative electrode terminal 24 (external terminal) for the external connection are attached to the sealing plate 22. The sealing plate 22 has a safety vent 30 and a filling port 32. The safety vent 30 is so constructed that the internal pressure of the battery case 20 can be released when the internal pressure increases to a predetermined level or higher (for example, the designed vent opening pressure is from about 0.3 MPa to about 1.0 MPa). FIG. 1 illustrates the battery in which, after an electrolyte solution has been filled, the filling port 32 is sealed by a sealing material 33. The battery case 20 as described above accommodates the electrode assembly 40.

<<Electrode Assembly 40 (Wound Electrode Assembly)>>

As illustrated in FIG. 2, the electrode assembly 40 has a strip-shaped positive electrode (positive electrode sheet 50), a strip-shaped negative electrode (negative electrode sheet 60), and strip-shaped separators (separators 72 and 74).

<<Positive Electrode Sheet 50>>

The positive electrode sheet 50 has a strip-shaped positive electrode current collector foil 51 and a positive electrode active material layer 53. A metal foil suitable for the positive electrode may be used preferably for the positive electrode current collector foil 51. For the positive electrode current collector foil 51, it is possible to use, for example, a strip-shaped aluminum foil having a predetermined width and a thickness of about 15 μm. An uncoated portion 52 is provided along one lateral-side edge of the positive electrode current collector foil 51. In the example shown in the figure, the positive electrode active material layer 53 is retained on both faces of the positive electrode current collector foil 51 except for the uncoated portion 52 provided in the positive electrode current collector foil 51. The positive electrode active material layer 53 contains a positive electrode active material. The positive electrode active material layer 53 is formed by coating a positive electrode mixture containing the positive electrode active material onto the positive electrode current collector foil 51.

For the positive electrode active material, it is possible to use any conventional substance that has been used for lithium-ion secondary batteries, either alone or in combination, without any particular limitation. Preferable examples include: oxides containing lithium and one or more transition metal elements (i.e., lithium-transition metal oxide), such as lithium nickel oxide (for example, $LiNiO_2$), lithium cobalt oxide (for example, $LiCoO_2$), and lithium manganese oxide ($LiMn_2O_4$); and phosphates containing lithium and one or more transition metal elements, such as lithium manganese phosphate ($LiMnPO_4$) and lithium iron phosphate ($LiFePO_4$).

<<Conductive Agent>>

Examples of the conductive agent include carbon materials, such as carbon powder and carbon fiber. It is possible to use one of the just-mentioned examples of the conductive agents either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Binder>>

The binder serves to bond the particles of the positive electrode active material and the particles of the conductive agent contained in the positive electrode active material layer 53 with each other, and to bond these particles with the positive electrode current collector foil 51. As the binder, it is possible to use polymers that can be dissolved or dispersed in the solvent used. For example, for the positive electrode mixture composition using an aqueous solvent, it is preferable to employ water-soluble or water-dispersible polymers, including: cellulose-based polymers (such as carboxymethylcellulose (CMC) and hydroxypropyl methyl cellulose (HPMC)); fluoropolymers (such as polyvinyl alcohol (PVA), polytetrafluoroethylene (PTFE), and tetrafluoroethylene-hexafluoropropylene copolymer (FEP)); and rubber materials (such as vinyl acetate copolymer, styrene-butadiene copolymer (SBR), acrylic acid-modified SBR resin (SBR latex)). For the positive electrode mixture composition using a non-aqueous solvent, it is preferable to employ polymers (such as polyvinylidene fluoride (PVDF), polyvinylidene chloride (PVDC), and polyacrylonitrile (PAN)).

<<Negative Electrode Sheet 60>>

As illustrated in FIG. 2, the negative electrode sheet 60 has a strip-shaped negative electrode current collector foil 61 and a negative electrode active material layer 63. It is possible to use a metal foil that is suitable for the negative electrode as the negative electrode current collector 61. A strip-shaped copper foil having a predetermined width and a thickness of about 10 μm is used for this negative electrode current collector foil 61. An uncoated portion 62 is provided along one lateral-side edge of the negative electrode current collector foil 61. The negative electrode active material layer 63 is formed on both faces of the negative electrode current collector foil 61 except for the uncoated portion 62, which is provided in the negative electrode current collector foil 61. The negative electrode active material layer 63 is retained by the negative electrode current collector foil 61, and at least a negative electrode active material is contained therein. In the negative electrode active material layer 63, a negative electrode mixture containing a negative electrode active material is coated on the negative electrode current collector foil 61.

<<Negative Electrode Active Material>>

For the negative electrode active material, it is possible to use any conventional substance used for lithium-ion secondary batteries, either alone or in combination, without any particular limitation. Preferable examples include carbon-based materials, such as graphite carbons and amorphous carbons, lithium-transition metal oxides, and lithium-transition metal nitrides. A preferable example of the separator sheet is one made of porous polyolefin-based resin.

<<Separators 72 and 74>>

Each of the separators 72 and 74 is a member for separating the positive electrode sheet 50 and the negative electrode sheet 60 from each other, as illustrated in FIG. 2. In this example, each of the separators 72 and 74 is made of a strip-shaped sheet having a plurality of micropores and having a predetermined width. For the separators 72 and 74, it is possible to use, for example, a single layer separator or a multi-layered separator, which is made of porous polyolefin-based resin. In this example, as illustrated in FIG. 2, the width b1 of the negative electrode active material layer 63 is slightly wider than the width a1 of the positive electrode active material layer 53. In addition, the width c1, c2 of the separators 72 and 74 is slightly wider than the width b1 of the negative electrode active material layer 63 (c1, c2>b1>a1).

In the example shown in FIG. 2, each of the separators 72 and 74 is made of a sheet-shaped member. Each of the separators 72 and 74 should be a member that insulates the positive electrode sheet 53 and the negative electrode sheet 63 from each other and at the same time permits transfer of electrolyte. Therefore, the separators 72 and 74 are not limited to sheet-shaped members. In place of the sheet-shaped member, each of the separators 72 and 74 may be made of, for example, a layer of insulative particles that are formed on a surface of the positive electrode active material layer 53 or the negative electrode active material layer 63. The insulative particles may be made of an insulative inorganic filler (for example, a filler of metal oxide or metal hydroxide) or insulative resin particles (for example, particles of polyethylene or polypropylene).

<<Fitting of Electrode Assembly 40>>

In this embodiment, as illustrated in FIG. 2, the electrode assembly 40 is pressed and deformed into a flat shape in one direction orthogonal to the winding axis WL. In the example shown in FIG. 2, the uncoated portion 52 of the positive electrode current collector foil 51 and the uncoated portion 62 of the negative electrode current collector foil 61 are exposed from the respective sides of the separators 72 and 74 in a spiral shape. In this embodiment, as illustrated in FIG. 1, in the electrode assembly 40, the intermediate portions of the uncoated portions 52 (62), which jut out from the separators 72 and 74, are gathered and welded respectively to the foremost end portions 23a and 24a of the positive and negative internal terminals 23 and 24, which is placed in the battery case 20. The electrolyte solution can infiltrate the inside of the electrode assembly 40 from the axial ends of the winding axis WL (see FIG. 2).

<<Electrolyte Solution (Liquid Electrolyte)>>

As the electrolyte solution, the same type of non-aqueous electrolyte solution as used for conventional lithium-ion batteries may be used without any particular limitation. Such a non-aqueous electrolyte solution typically has a composition in which an appropriate non-aqueous solvent contains a supporting salt. Examples of the non-aqueous solvent include ethylene carbonate, propylene carbonate, dimethyl carbonate, diethyl carbonate, ethyl methyl carbonate, 1,2-dimethoxyethane, 1,2-diethoxyethane, tetrahydrofuran, and 1,3-dioxolane, either alone or in combination. Examples of the supporting salt include lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$. One example of the non-aqueous electrolyte solution is a non-aqueous electrolyte solution in which $LiPF_6$ is contained at a concentration of about 1 mol/L in a mixed solvent of ethylene carbonate and diethyl carbonate (e.g., a mixed solvent with a mass ratio of about 1:1).

In the lithium-ion secondary battery 10, the positive electrode current collector foil 51 and the negative electrode current collector foil 61 are electrically connected to an external device via the electrode terminals 23 and 24, which penetrate through the battery case 20. The operation of the lithium-ion secondary battery 10 during charge and during discharge will be described in the following.

<<Operation During Charge>>

Figure 3:
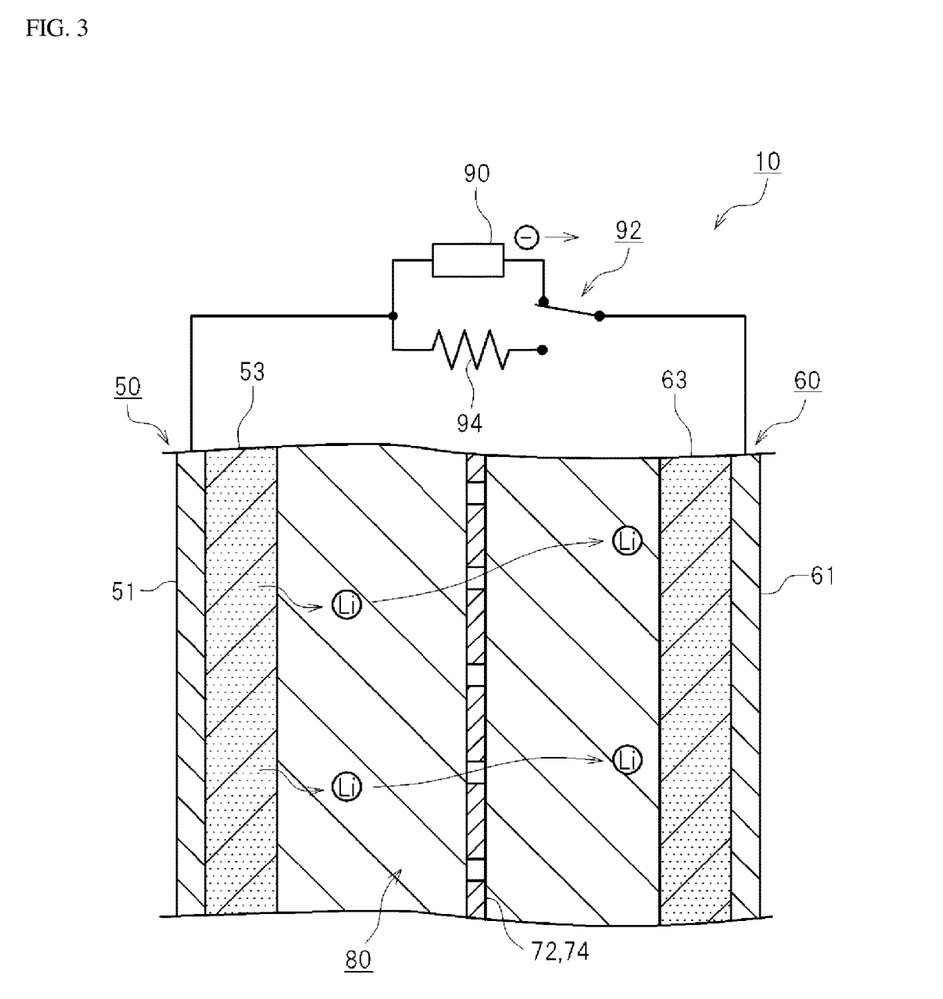
FIG. 3 is a schematic view illustrating a state of the lithium-ion secondary battery during charge.

FIG. 3 schematically illustrates the state of the lithium-ion secondary battery 10 during charge. During charge, the lithium-ion secondary battery 10 is brought into such a state that the electrode terminals 23 and 24 (see FIG. 1) are connected to a charger 90 by a switch 92, as illustrated in FIG. 3. During charge, the charger 90 applies a voltage between the positive electrode sheet 50 and the negative electrode sheet 60. Thereby lithium ions (Li) are released into the electrolyte solution 80 from the positive electrode active material in the positive electrode active material layer 53, and electric charge is discharged from the positive electrode active material layer 53. The discharged electric charge is transferred to the positive electrode current collector foil 51 and further transferred through the charger 90 to the negative electrode sheet 60. In the negative electrode sheet 60, electric charge is stored, and also the lithium ions (Li) in the electrolyte solution 80 are absorbed and stored in the negative electrode active material in the negative electrode active material layer 63. As a result, a potential difference arises between the negative electrode sheet 60 and the positive electrode sheet 50.

<<Operation During Discharge>>

Figure 4:
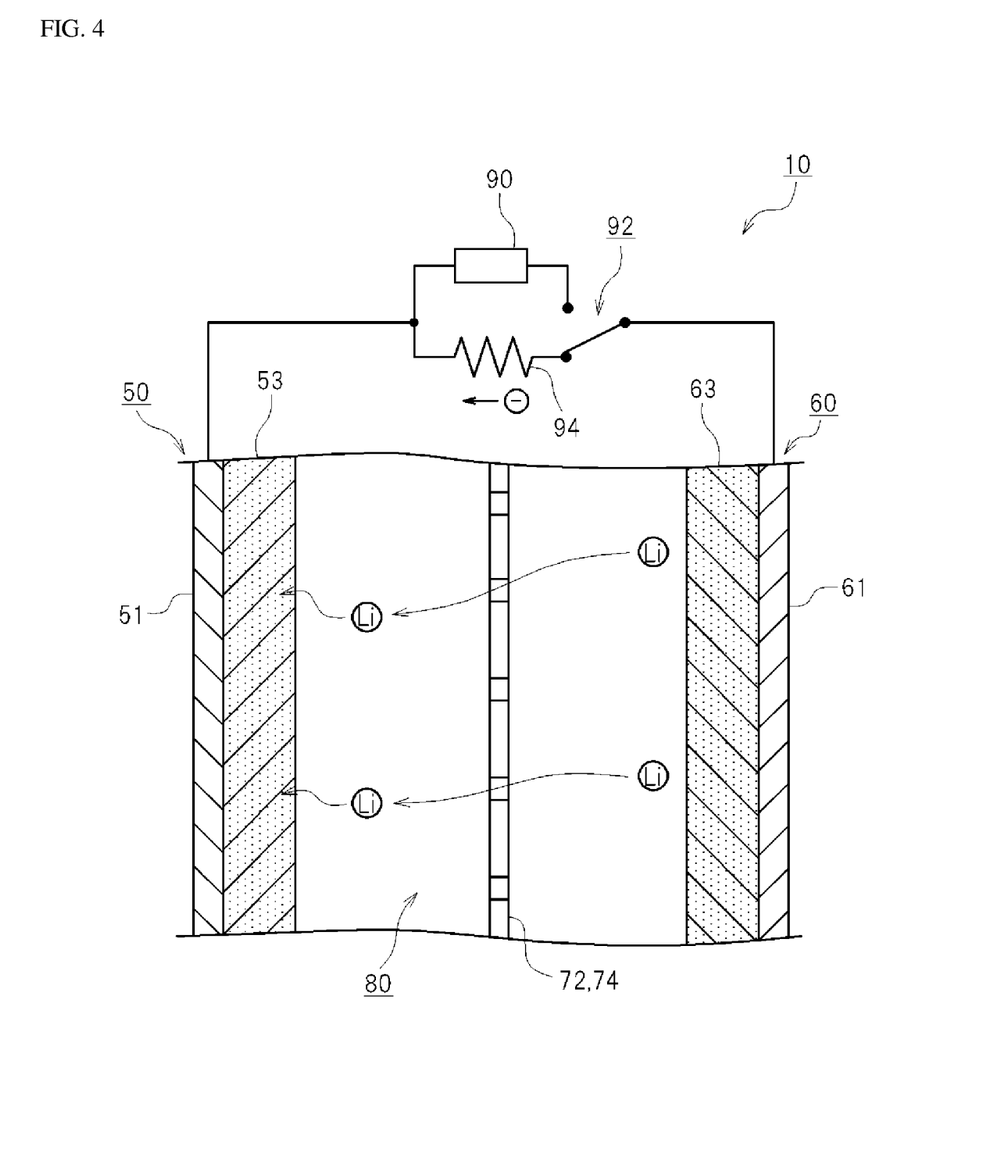
FIG. 4 is a schematic view illustrating a state of the lithium-ion secondary battery during discharge.

FIG. 4 schematically illustrates the state of the lithium-ion secondary battery 10 during discharge. During discharge, the lithium-ion secondary battery 10 is brought into such a state that the electrode terminals 23 and 24 (see FIG. 1) are connected to a resistor 94 by the switch 92, as illustrated in FIG. 4. During discharge, the potential difference between the negative electrode sheet 60 and the positive electrode sheet 50 allows electric charge to be transferred from the negative electrode sheet 60 to the positive electrode sheet 50 via the resistor 94. Also, the lithium ions stored in the negative electrode active material layer 63 are released into the electrolyte solution 80. In the positive electrode, the lithium ions in the electrolyte solution 80 are absorbed by the positive electrode active material in the positive electrode active material layer 53.

In this way, during charge and discharge of the lithium-ion secondary battery 10, lithium ions are absorbed and released between the positive electrode active material in the positive electrode active material layer 53 and the negative electrode active material in the negative electrode active material layer 63. Thus, lithium ions are transferred back and forth between the positive electrode active material layer 53 and the negative electrode active material layer 63 through the electrolyte solution 80.

<<Film Forming Agent>>

By adding a film forming agent to the electrolyte solution, a surface film is formed on the positive electrode active material and the negative electrode active material during the initial charging of the lithium-ion secondary battery 10. Herein, the term "film forming agent" means such an additive agent that causes a surface film to be formed on the positive electrode active material and the negative electrode active material during the initial charging when the film forming agent is added to the electrolyte solution, and that causes gases to be generated at the same time. Examples of the film forming agent include $LiPF_2(C_2O_4)_2$, $LiB(C_2O_4)_2$, $LiPF_2(C_3O_4)_2$, and $LiB(C_3O_4)_2$.

Herein, $LiPF_2(C_2O_4)_2$ is represented by the following chemical formula.

[Chemical formula 1]

(I)

$LiB(C_2O_4)_2$ is represented by the following chemical formula.

[Chemical formula 2]

(II)

<<Reaction of $LiPF_2(C_2O_4)_2$>>

$LiPF_2(C_2O_4)_2$ is added to the electrolyte solution so as to serve as the film forming agent. The addition of $LiPF_2(C_2O_4)_2$ to the electrolyte solution causes a surface film of $LiPO_2F_2$ to be formed on the positive electrode active material and the negative electrode active material during the initial charging.

The reaction formula of $LiPF_2(C_2O_4)_2$ is, for example, as shown below. When 1 mol of $LiPF_2(C_2O_4)_2$ is decomposed, approximately 1 mol of surface film ($LiPO_2F_2$) is formed, and approximately 2 mol of CO and approximately 2 mol of CO2 are generated. Thus, when $LiPF_2(C_2O_4)_2$ is added as a film forming agent to the electrolyte solution, considerable amounts of gases (CO and $CO_2$) are generated during the initial charging.

$$LiPF_2(C_2O4)_2 \rightarrow LiPO_2F_2 + 2CO + 2CO_2$$

<<Reaction of $LiB(C_2O_4)_2$>>

Likewise, $LiB(C_2O_4)_2$ is decomposed during the initial charging, and considerable amounts of gases (CO and $CO_2$) are generated during the initial charging. If $LiB(C_2O_4)_2$ remains in the electrolyte solution even after gas venting is performed, there may be a case in which gases derived from $LiB(C_2O_4)_2$ are generated by subsequent use of the lithium-ion secondary battery 10.

The reaction formula of $LiB(C_2O_4)_2$ is, for example, as shown below. When 2 mol of $LiB(C_2O_4)_2$ is decomposed, a surface film ($Li_2C_2O_4 + B_2O_3$) is formed, and approximately 3 mol of CO and approximately 3 mol of $CO_2$ are generated. Thus, when $LiB(C_2O_4)_2$ is added as a film forming agent to the electrolyte solution, considerable amounts of gases (CO and $CO_2$) are generated during the initial charging.

$$2LiB(C_2O_4)_2 \rightarrow Li_2C_2O_4 + B_2O_3 + 3CO + 3CO_2$$

The surface film formed here serves to inhibit the resistance of the lithium-ion secondary battery 10 from increasing and to improve the life of the battery capacity. When taking the rate of reaction of the film formation into consideration, $LiPF_2(C_2O_4)_2$ is more preferable as the film forming agent than $LiB(C_2O_4)_2$ is. When $LiPF_2(C_3O_4)_2$ and $LiB(C_3O_4)_2$ are used as well, a surface film is formed by similar reactions during the initial charging, and considerable amounts of gases (CO and $CO_2$) are generated during the initial charging.

<<Gas Venting Process>>

When a film forming agent is added to the electrolyte solution, a large amount of gas is generated during the initial charging due to the decomposition of the film forming agent. For this reason, gas venting is carried out after the initial charging. More specifically, the lithium-ion secondary battery 10 is provisionally sealed after the electrolyte solution is filled therein, then subjected to gas venting after the initial charging, and thereafter properly sealed.

Nevertheless, even after the gas venting, an unreacted film forming agent may sometimes remain in the electrolyte solution. In that case, gases derived from the film forming agent may be generated by subsequent use of the lithium-ion secondary battery 10. Because the battery case 20 has already been sealed at this stage, most of the generated gases stays inside the battery case 20, causing the internal pressure of the lithium-ion secondary battery 10 to increase.

<<Operating Pressure of Safety Vent and Current Shut-Off Valve>>

As described above, when a film forming agent is added to the electrolyte solution, considerable amounts of gases are generated during the initial charging. After the battery is initially charged, gas venting is carried out, and the battery is sealed. However, there may be a case that gases are generated due to the remaining film forming agent in the battery in subsequent use of the battery, causing the internal pressure of the lithium-ion secondary battery 10 to increase. When there is a cause of the internal pressure increase of the battery case 20 that results from the film forming agent, it is necessary that the operating pressure of the safety vent and the operating pressure of the current shut-off valve called CID (not shown) should be increased accordingly. Moreover, when there are variations in the increase of the internal pressure of the battery case 20 due to the film forming agent, it becomes difficult to adjust the operating pressure of the safety vent and the current shut-off valve. In addition, it limits the materials that can be used, which lowers the freedom in cell designing. Furthermore, when the cell swells, the size of the jig that restrains the cell no longer fits the size of the cell, so the jig can no longer restrain the cell.

In addition, in order to suppress the generation of gases derived from the film forming agent, it is necessary, for example, to adjust the amount of the film forming agent to be added so that an appropriate surface film can be formed during the initial charging and also the unreacted film forming agent does not remain in the electrolyte solution after the gas venting process.

<<Method of Manufacturing a Lithium-Ion Secondary Battery>>

Herein, a novel method of manufacturing a lithium-ion secondary battery that can suppress the generation of gases derived from the film forming agent is proposed. A method of manufacturing a lithium-ion secondary battery proposed herein includes the following steps.

1. Step A of preparing a battery in which an electrode assembly is enclosed in a battery case.
2. Step B of filling a first electrolyte solution containing a film forming agent into the battery case.
3. Step C of charging and discharging the battery filled with the first electrolyte solution.
4. Step D of discharging the first electrolyte solution from the battery that has been charged and discharged.
5. Step E of filling a second electrolyte solution containing a film forming agent at a concentration of less than 0.005 mol/L into the battery case from which the first electrolyte solution has been discharged.

In such a method of manufacturing a lithium-ion secondary battery, a surface film derived from the addition of the film forming agent to the electrolyte solution is formed in the electrode assembly at the step of charging and discharging the battery filled with the first electrolyte solution containing the film forming agent (at step C). Thereafter, the first electrolyte solution is discharged (at step D), and the second electrolyte solution containing a film forming agent at a concentration of less than 0.005 mol/L is filled into the battery case (at step E).

In the lithium-ion secondary battery manufactured by such a manufacturing method, an appropriate surface film is formed in the electrode assembly at step C. At step D, an excess film forming agent that has remained in the electrolyte solution is discharged. Then, at step E, the electrolyte solution that is substantially free of the film forming agent (i.e., the second electrolyte solution) is filled into the battery case. Thereafter, the lithium-ion secondary battery 10 is sealed. As a result, an appropriate surface film is formed in the electrode assembly of the lithium-ion secondary battery, and at the same time, the amount of the film forming agent remaining in the battery case is small. Therefore, in the subsequent charging and discharging, the amount of the gases that are generated in the battery case due to the film forming agent remaining in the battery case is extremely small, so that the increase of the internal pressure of the lithium-ion secondary battery 10 is suppressed to a small extent.

Hereinbelow, each of the steps will be described.

<<Step A>>

Step A is the step of preparing a lithium-ion secondary battery 10 (see FIG. 1) in which an electrode assembly 40 is enclosed in a battery case 20. In other words, the lithium-ion secondary battery 10 in which the electrolyte solution has not yet been filled in the battery case 20 is prepared in this step A. The lithium-ion secondary battery in which the electrolyte solution has not yet been filled in the battery case may also be referred to as, for example, a "battery structure body".

<<Step B: Electrolyte Filling Step>>

Step B is the step of filling the first electrolyte solution containing a film forming agent into the battery case 20. This step may also be referred to as an electrolyte filling step. In this step, an appropriate amount of film forming agent that is suitable for forming a surface film in the electrode assembly is added to the first electrolyte solution that is to be filled in the battery case 20. Herein, it is desirable that the amount of the film forming agent to be put into the first electrolyte solution be, for example, about 0.015 mol/L or greater, more preferably about 0.020 mol/L or greater, or about 0.025 mol/L. It is also desirable that the upper limit of the amount of the film forming agent to be put into the first electrolyte solution be about 0.2 mol/L or less, more preferably 0.1 mol/L or less.

<<Step C: Surface Film Forming Step>>

Step C is the step of charging and discharging the battery filled with the first electrolyte solution. Step C is a so-called conditioning process, which includes the initial charging and discharging. Here, a surface film is formed in the electrode assembly 40 due to the film forming agent. This step may also be referred to as a surface film forming step. The charging and discharging may include one time charging and one time discharging, or may include a plurality of repeated charging and discharging cycles.

<<Step D: Electrolyte Venting Step>>

Step D is the step of discharging the first electrolyte solution from the battery that has been charged and discharged. This step may also be referred to as an electrolyte venting step. More specifically, in this step, the electrolyte solution containing the film forming agent is discharged after the surface film has been formed at the initial charging. In this step, it is desirable that, for example, the filling port 32 be opened, and the first electrolyte solution in the battery case 20 be sucked out using a syringe inserted therein. Thereby, the first electrolyte solution that contains the unreacted film forming agent can be discharged.

It is desirable that all of the first electrolyte solution be discharged at this stage, but in reality, it is difficult to discharge all of the first electrolyte solution because the first electrolyte solution is impregnated in the electrode assembly. It is desirable that most of the film forming agent remaining in the battery case 20 be discharged. This means that a small amount of the first electrolyte solution may remain therein. In addition, such step D allows the gases generated during the surface film formation at step C to be also discharged. For example, it is desirable that 50% or more, more preferably 75% or more, still more preferably 80% or more of the first electrolyte solution be discharged from the battery case 20.

<<Step E: Refilling Step>>

Step E is the step of filling a second electrolyte solution containing a film forming agent at a concentration of less than 0.005 mol/L into the battery case 20 from which the first electrolyte solution has been discharged. This step may also be referred to as a refilling step. In this step, it is desirable that the electrolyte solution that is substantially free of the film forming agent be filled into the battery case 20. Preferably, the second electrolyte solution may be free of the film forming agent. This makes it possible to manufacture the lithium-ion secondary battery 10 in which the surface film derived from the film forming agent is formed in the electrode assembly but the amount of the film forming agent contained in the electrolyte solution is extremely small.

Such a lithium-ion secondary battery 10 contains an extremely small amount of the film forming agent in the electrolyte solution. Therefore, in the subsequent charging and discharging, the amount of gases generated due to the film forming agent is small. As a result, the increase of the internal pressure of the lithium-ion secondary battery 10 can be suppressed to a small extent.

<<Comparative Test>>

Figure 5:
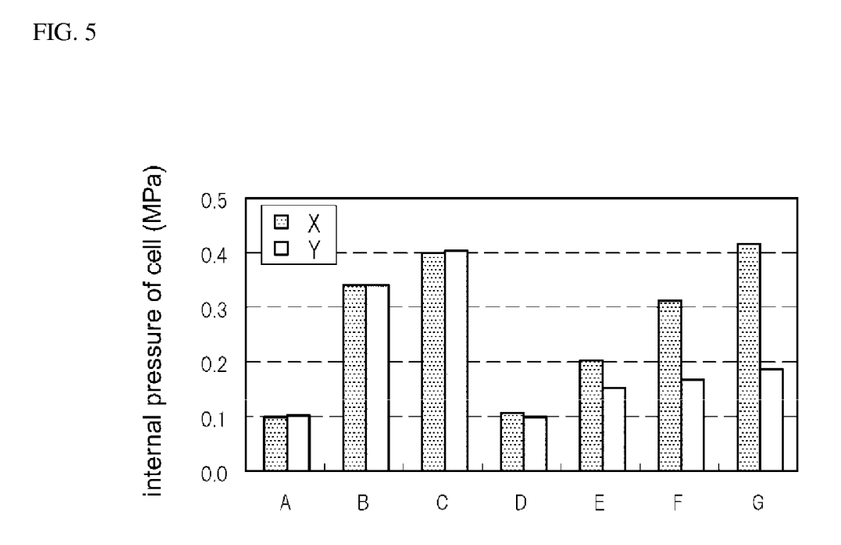
FIG. 5 is a graph illustrating the results of a comparative test.

The present inventor confirmed, through a test in which samples (test cells) were prepared, that such a method of manufacturing a lithium-ion secondary battery can suppress the increase of the internal pressure of the lithium-ion secondary battery to a small extent. FIG. 5 shows the comparative test conducted by the present inventor.

<<Test Cell>>

The following describes the test cell that obtained the test results shown in FIG. 5. Herein, 18650-type cells were prepared as the test cells, and laminate cells were prepared for measuring the amount of generated gas. All the cells prepared herein were lithium-ion secondary batteries.

<<Positive Electrode of the Test Cell>>

A positive electrode mixture was prepared to form the positive electrode active material layer in the positive electrode. Herein, the positive electrode mixture was prepared using a three-component lithium-transition metal oxide ($LiNi_{1/3}CO_{1/3}Mn_{1/3}O_2$) as the positive electrode active material, acetylene black (AB) as a conductive agent, and polyvinylidene fluoride (PVDF) as a binder. The mass ratio of the positive electrode active material, the conductive agent, and the binder was set so that the positive electrode active material:the conductive agent:the binder=90:8:2. The positive electrode active material, the conductive agent, and the binder, were mixed with ion exchange water to thereby prepare the positive electrode mixture. Next, the positive electrode mixture was applied onto one side of the positive electrode current collector foil, then applied onto the other side thereof, and dried, to prepare a positive electrode (positive electrode sheet) having a positive electrode active material layer coated on each side of the positive electrode current collector foil.

Herein, an aluminum foil (thickness 15 μm) was used as the positive electrode current collector foil. The amount of the positive electrode mixture coated on the positive electrode current collector foil was set so that both sides of the positive electrode current collector foil have approximately an equal amount, and that the amount of the positive electrode active material layer would be 25 mg/cm$^2$ per one side of the positive electrode current collector foil after the positive electrode mixture was dried. After having been dried, the electrode sheet was rolled by a roller press to set the density of the mixture of the positive electrode active material layer to 2.8 g/cm$^3$.

<<Negative Electrode of the Test Cell>>

A negative electrode mixture was prepared to form the negative electrode active material layer in the negative electrode. Herein, the negative electrode mixture was prepared using natural flake graphite as the negative electrode active material, carboxymethylcellulose (CMC) as a thickening agent, and a binder. Styrene-butadiene rubber (SBR), which is a rubber-based binder, was used for the binder. The mass ratio of the negative electrode active material, the thickening agent (CMC), and the binder (SBR) was set so that the negative electrode active material:CMC:SBR=98:1:1. The negative electrode active material, the CMC, and the SBR, were mixed with ion exchange water to thereby prepare the negative electrode mixture. Next, the negative electrode mixture was applied onto one side of the positive electrode current collector foil, then applied onto the other side thereof, and dried, to prepare a negative electrode (positive electrode sheet) having a negative electrode active material layer coated on each side of the negative electrode current collector foil.

Herein, a copper foil (thickness 10 μm) was used as the negative electrode current collector foil. The amount of the negative electrode mixture coated on the negative electrode current collector foil was set so that both sides of the negative electrode current collector foil have approximately an equal amount, and that the amount of the negative electrode active material layer would be 20 mg/cm$^2$ per one side of the negative electrode current collector foil after the negative electrode mixture was dried. After having been dried, the electrode sheet was rolled by a roller press to set the density of the mixture of the positive electrode active material layer to 1.4 g/cm$^3$.

<<Separator of the Test Cell>>

A separator made of a microporous sheet having a three-layer structure (PP/PE/PP) of polypropylene (PP) and polyethylene (PE) was used as the separator.

<<Assembling of the Test Cell>>

A wound electrode assembly was prepared using the positive electrode sheet, the negative electrode sheet, and the separators prepared in the foregoing manner. The prepared wound electrode assembly was enclosed in a cylindrically-shaped battery case, then a non-aqueous electrolyte solution was filled therein, and the battery case was sealed, to thereby construct a 18650-type test cell.

<<Electrolyte Solution>>

Here, an electrolyte solution prepared by dissolving 1 mol/L of LiPF6 as a lithium salt in a mixed solvent of ethylene carbonate (EC), dimethyl carbonate (DMC), and ethyl methyl carbonate (EMC) in a predetermined volume ratio (EC:DMC:EMC=3:4:3) was used as the non-aqueous electrolyte solution. In the above-described comparative test, a non-aqueous electrolyte solution containing 0.025 mol/L of LiPF2(C2O4)2 as the film forming agent was employed as the "first electrolyte solution". Also, a non-aqueous electrolyte solution free of the film forming agent was employed as the "second electrolyte solution".

<<Sample X>>

Sample X was prepared in the following manner. A lithium-ion secondary battery 10 filled with the first electrolyte solution containing the film forming agent was subjected to initial charging, and thereafter, an aging process was performed. Then, the gases were vented, and the lithium-ion secondary battery 10 was sealed. Accordingly, the internal pressure is shown for the lithium-ion secondary battery 10 manufactured through the following steps: electrolyte filling→surface film formation (initial charging and discharging)→aging→gas venting→sealing.

For the graph bars for sample X, bar A represents the internal pressure after filling the first electrolyte solution. Bar B represents the internal pressure after the initial charging and discharging. Bar C represents the internal pressure after the aging process. Bar D represents the internal pressure after the gas venting. Bar E represents the internal pressure after 30 days in the high-temperature storage endurance test. Bar F represents the internal pressure after 60 days in the high-temperature storage endurance test. Bar G represents the internal pressure after 90 days in the high-temperature storage endurance test.

<<Sample Y>>

Sample Y was prepared in the following manner. A lithium-ion secondary battery 10 filled with the first electrolyte solution containing the film forming agent was subjected to initial charging, and thereafter, an aging process was performed. Then, the electrolyte solution was vented, the second electrolyte solution substantially free of the film forming agent was filled therein, and the lithium-ion secondary battery 10 was sealed. Accordingly, the internal pressure is shown for the lithium-ion secondary battery 10 manufactured through the following steps: electrolyte filling (first electrolyte solution)→surface film formation (initial charging and discharging)→aging→electrolyte venting→refilling (second electrolyte solution)→sealing.

For the graph bars for sample Y, bar A represents the internal pressure after filling the first electrolyte solution. Bar B represents the internal pressure after the initial charging and discharging. Bar C represents the internal pressure after the aging process. Bar D represents the internal pressure after the electrolyte venting. Bar E represents the internal pressure after 30 days in the high-temperature storage endurance test. Bar F represents the internal pressure after 60 days in the high-temperature storage endurance test. Bar G represents the internal pressure after 90 days in the high-temperature storage endurance test.

<<Initial Charging and Discharging>>

In this comparative test, the initial charging and discharging process was carried out in the following manner. Each of the test cells is charged at a constant current of 0.2 C to 4.1 V (I), then rested for 10 minutes (II), and discharged at a constant current of 0.2 C to 3.0 V (III). Such procedures (I) to (III) are repeated 3 times. Subsequently, each of the test cells is charged at a constant current of 0.2 C to 4.1 V (IV), and thereafter charged at a constant voltage of 4.1 V for 8 hours (V).

<<Aging Process>

The aging process was carried out as follows. After the process (V) of the initial charging and discharging, each of the test cells was kept at 4.1 V and stored in a thermostatic chamber at 45° C. for 24 hours.

<<High-Temperature Storage Endurance Test>>

The high-temperature endurance storage test herein was as follows. The charge capacity of each of the test cells was adjusted to 90% SOC (3.98 V), and each of the cells was stored in a thermostatic chamber at 60° C. The changes in the internal pressure were observed.

<<Measurement of Internal Pressure>>

Herein, the internal pressure of the test cell was measured using an internal pressure sensor fitted to the filling port.

As illustrated in FIG. 5, it was confirmed that the internal pressure of the sample X, which was subjected to the gas venting, gradually increased after 30 days (E), after 60 days (F), and after 90 days (G) in the high-temperature storage endurance test. In contrast, it was confirmed that the sample Y, which was subjected to the electrolyte venting, showed that the increase of the internal pressure was suppressed to a small extent after 30 days (E), after 60 days (F), and after 90 days (G) in the high-temperature storage endurance test.

Thus, the lithium-ion secondary battery shows that, by discharging the electrolyte solution (electrolyte venting) after the surface film formation (the initial charging and discharging) and refilling the second electrolyte solution substantially free of the film forming agent, the increase of the internal pressure tends to be suppressed to a small extent particularly in relation to storage endurance at high temperature. Such a tendency can also be observed in various types of lithium-ion secondary batteries, not just in the test cells. Moreover, the film forming agent is not limited to $LiPF_2(C_2O_4)_2$. The same tendency is obtained when using $LiB(C_2O_4)_2$, $LiPF_2(C_3O_4)_2$, and $LiB(C_3O_4)_2$, for the film forming agent.

<<Second Electrolyte Solution>>

Next, it is desirable that an electrolyte solution free of film forming agent be used for the second electrolyte solution. In other words, the use of the electrolyte solution free of the film forming agent for the second electrolyte solution filled in the refilling step makes it possible to reduce the amount of the film forming agent remaining in the lithium-ion secondary battery after the proper sealing of the battery.

Figure 6:
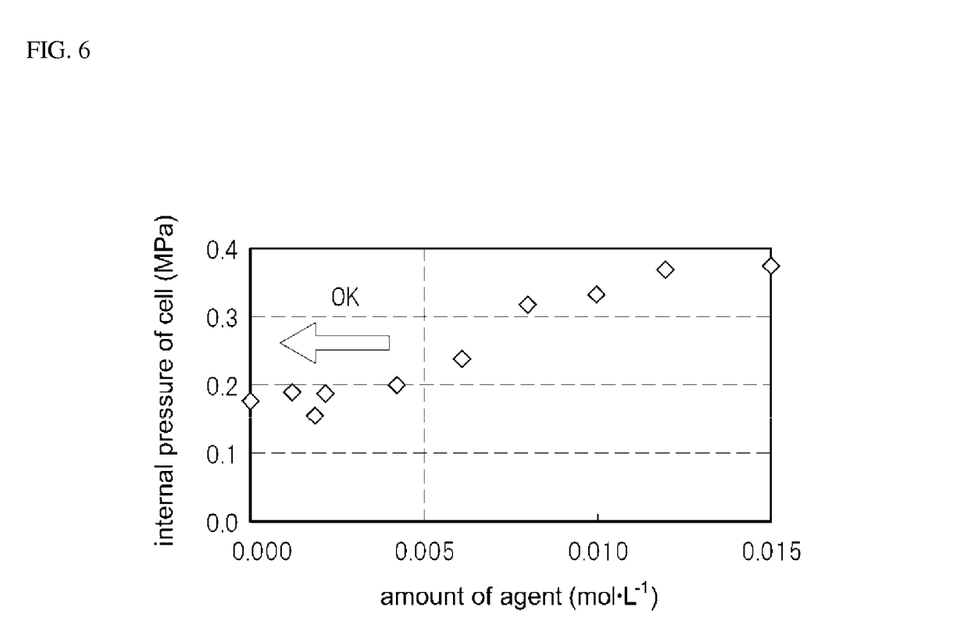
FIG. 6 is a graph illustrating the results of a test for the second electrolyte solution.

However, it is possible that the second electrolyte solution may contain a small amount of the film forming agent. FIG. 6 shows the relationship between the concentration of the film forming agent added to the second electrolyte solution and the internal pressure of the test cells after 90 days through the high-temperature storage endurance test, based on the test cells as described above. Here, $LiPF_2(C_2O_4)_2$ is used as the film forming agent.

As illustrated in FIG. 6, the test conducted by the present inventor demonstrates that, even when the second electrolyte solution contains about 0.005 mol/L of the film forming agent, the internal pressure of the test cell after 90 days in the high-temperature storage endurance test can be kept low. This means that the second electrolyte solution filled in the refilling step may contain the film forming agent at a concentration of less than 0.005 mol/L. In other words, the second electrolyte solution filled in the refilling step may contain the film forming agent at a concentration of less than 0.005 mol/L, which is a concentration that the second electrolyte solution may be regarded as being substantially free of the film forming agent.

Thus, with the method of manufacturing a lithium-ion secondary battery proposed herein, the film forming agent is decomposed and a required surface film is formed in the step of charging and discharging the battery filled with the first electrolyte solution containing the film forming agent. Thereafter, the first electrolyte solution containing the film forming agent is discharged, and the second electrolyte solution containing the film forming agent at a concentration of less than 0.005 mol/L is filled into the battery case. As a result, an appropriate surface film can be formed in the electrode assembly, and also, the amount of the film forming agent remaining in the electrolyte solution can be reduced to a small amount. Then, the amount of the gases that are subsequently generated in the battery case due to the film forming agent can be reduced to a small amount, and the increase of the battery internal pressure can be suppressed to a small extent.

Herein, it is possible that the second electrolyte solution may be free of the film forming agent. This makes it possible to further reduce the amount of the film forming agent that remains in the battery. Therefore, the increase in the battery internal pressure can be suppressed to a smaller extent. It is possible that the film forming agent may be, for example, at least one additive agent selected from the group consisting of $LiPF_2(C_2O_4)_2$, $LiB(C_2O_4)_2$, $LiPF_2(C_3O_4)_2$, and $LiB(C_3O_4)_2$.

Moreover, as described previously, the lithium-ion secondary battery 10 manufactured by such a manufacturing method is a sealed-type lithium-ion secondary battery, and it includes, for example, a battery case 20, a wound electrode assembly 40 enclosed in the battery case 20, and an electrolyte solution enclosed in the battery case 20. The electrode assembly 40 includes a surface film derived from a film forming agent. In addition, the concentration of the film forming agent contained in the electrolyte solution inside the battery case 20 is less than 0.005 mol/L, and the mole ratio of the gas contained in the battery case 20 and derived from the film forming agent is less than 1/100 with respect to the surface film formed in the electrode assembly 40, where the battery is charged to 90% SOC and stored in a temperature environment of 60° C. for 90 days.

It is more preferable that the concentration of the film forming agent contained in the electrolyte solution inside the battery case 20 should be less than 0.003 mol/L, still more preferably less than 0.001 mol/L. Furthermore, it is more preferable that the mole ratio of the gas contained in the battery case 20 and derived from the film forming agent should be less than 1/500 with respect to the surface film formed in the electrode assembly 40, still more preferably less than 1/1000.

In addition, a preferable film forming agent is $LiPF_2(C_2O_4)_2$. $LiPF_2(C_2O_4)_2$ shows a fast rate of reaction of the surface film formation. The surface film formed here is $LiPO_2F_2$, and the gases derived from the film forming agent are $CO$ and $CO_2$.

Hereinabove, examples of the method of manufacturing a lithium-ion secondary battery and the sealed-type lithium-ion secondary battery according to one embodiment of the invention have been illustrated. However, the present invention is not limited by any of the foregoing embodiments. For example, the lithium-ion secondary battery may be what is called a cylindrical-type battery or a laminate-type battery.

Figure 7:
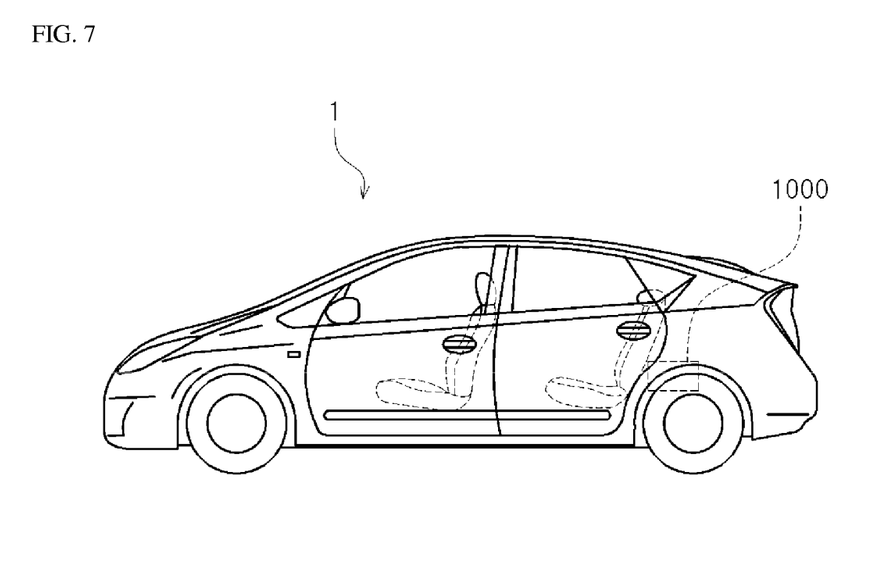
FIG. 7 is a view illustrating a vehicle incorporating a lithium-ion secondary battery (battery module).

In the sealed-type lithium-ion secondary battery manufactured by the manufacturing method proposed herein, a surface film derived from the film forming agent is formed in the electrode assembly, as described above. For this reason, for example, the resistance increase can be suppressed to a small extent. Moreover, because the amount of the film forming agent contained in the electrolyte solution is small, the internal pressure increase can be suppressed to a small extent even when the battery is brought into a charged state of about 90% SOC and is allowed to stand in a high temperature environment of about 60° C. Therefore, such a sealed-type lithium-ion secondary battery is suitable for the secondary battery that is to be mounted in vehicles in automobile applications, which requires a high level of adaptability to high temperature environments of about 60° C. In this case, as illustrated in FIG. 7, for example, the present invention can be suitably utilized in the form of a battery module, in which a plurality of secondary batteries are connected and combined, for a vehicle drive battery 1000 for driving a motor (electric motor) of a vehicle 1 such as an automobile.

REFERENCE SIGNS LIST

10—Lithium-ion secondary battery
20—Battery case
21—Case main body
22—Sealing plate
23—Positive electrode terminal
24—Negative electrode terminal
30—Safety vent
32—Filling port
33—Sealing material
40—Electrode assembly
50—Positive electrode sheet
51—Positive electrode current collector foil
52—Uncoated portion
53—Positive electrode active material layer
60—Negative electrode sheet
61—Negative electrode current collector foil
62—Uncoated portion
63—Negative electrode active material layer
72, 74—Separator
80—Electrolyte solution
90—Charger
92—Switch
94—Resistor
1000—Vehicle drive battery
WL—Winding axis

The invention claimed is:

1. A method of manufacturing a lithium-ion secondary battery, comprising:
   preparing a battery in which an electrode assembly is enclosed in a battery case;
   filling a first electrolyte solution containing a film forming agent into the battery case;
   charging and discharging the battery filled with the first electrolyte solution;
   discharging the first electrolyte solution from the battery that has been charged and discharged; and
   filling a second electrolyte solution containing the film forming agent at a concentration of less than 0.005 mol/L into the battery case from which the first electrolyte solution has been discharged.

2. The method of manufacturing a lithium-ion secondary battery according to claim 1, wherein the second electrolyte solution is free of the film forming agent.

3. The method of manufacturing a lithium-ion secondary battery according to claim 1, wherein the film forming agent is at least one additive agent selected from the group consisting of $LiPF_2(C_2O_4)_2$, $LiB(C_2O_4)_2$, $UPF_2(C_3O_4)_2$, and $LiB(C_3O_4)_2$.

* * * * *